May 9, 1933. P. KOENIG 1,908,261
METHOD AND APPARATUS FOR MANUFACTURE OF SPRING COILS
Filed July 22, 1931 5 Sheets-Sheet 1

INVENTOR
Paul Koenig
BY Nathaniel Frucht
his ATTORNEY

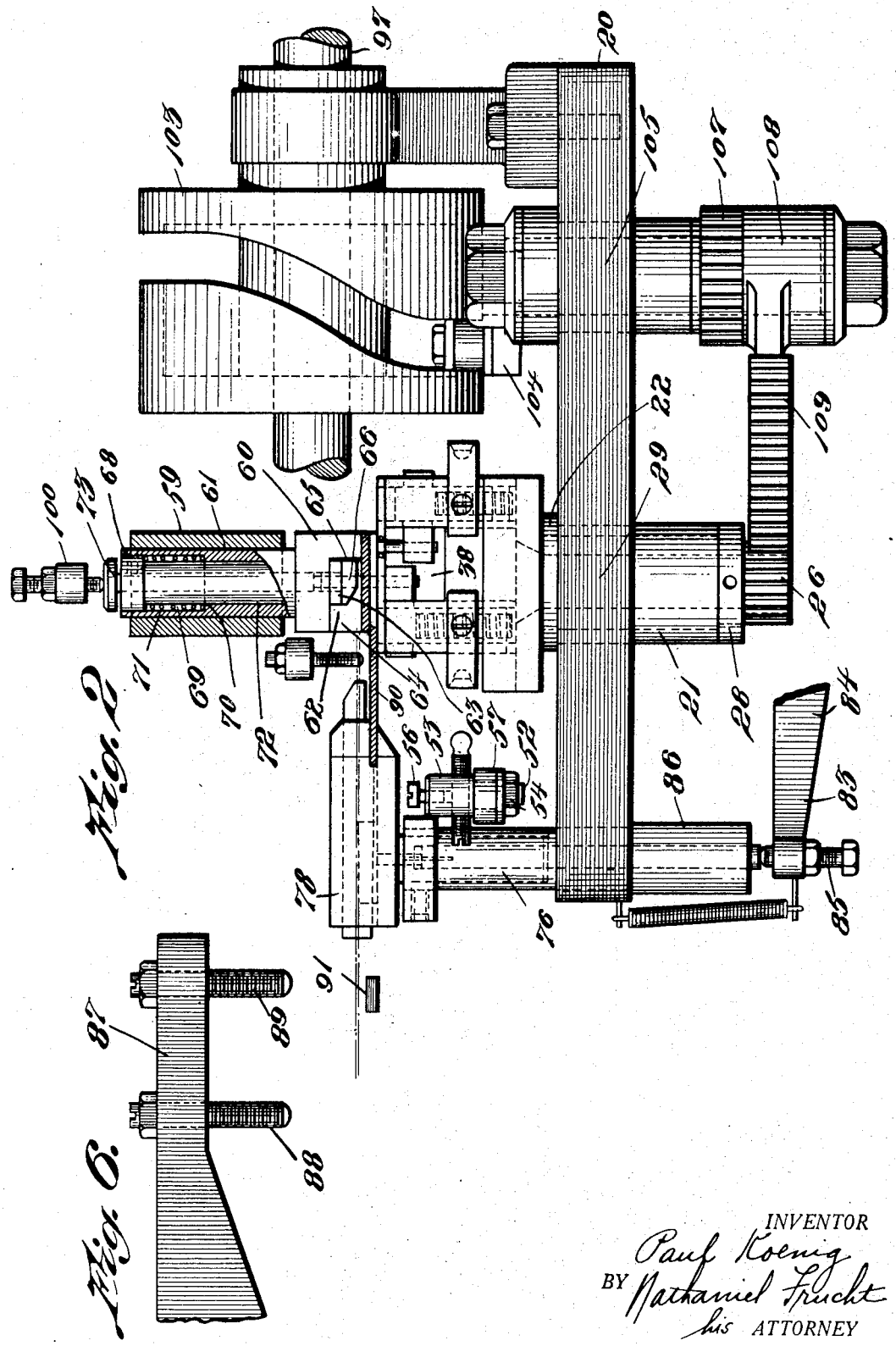

May 9, 1933. P. KOENIG 1,908,261
METHOD AND APPARATUS FOR MANUFACTURE OF SPRING COILS
Filed July 22, 1931 5 Sheets-Sheet 3
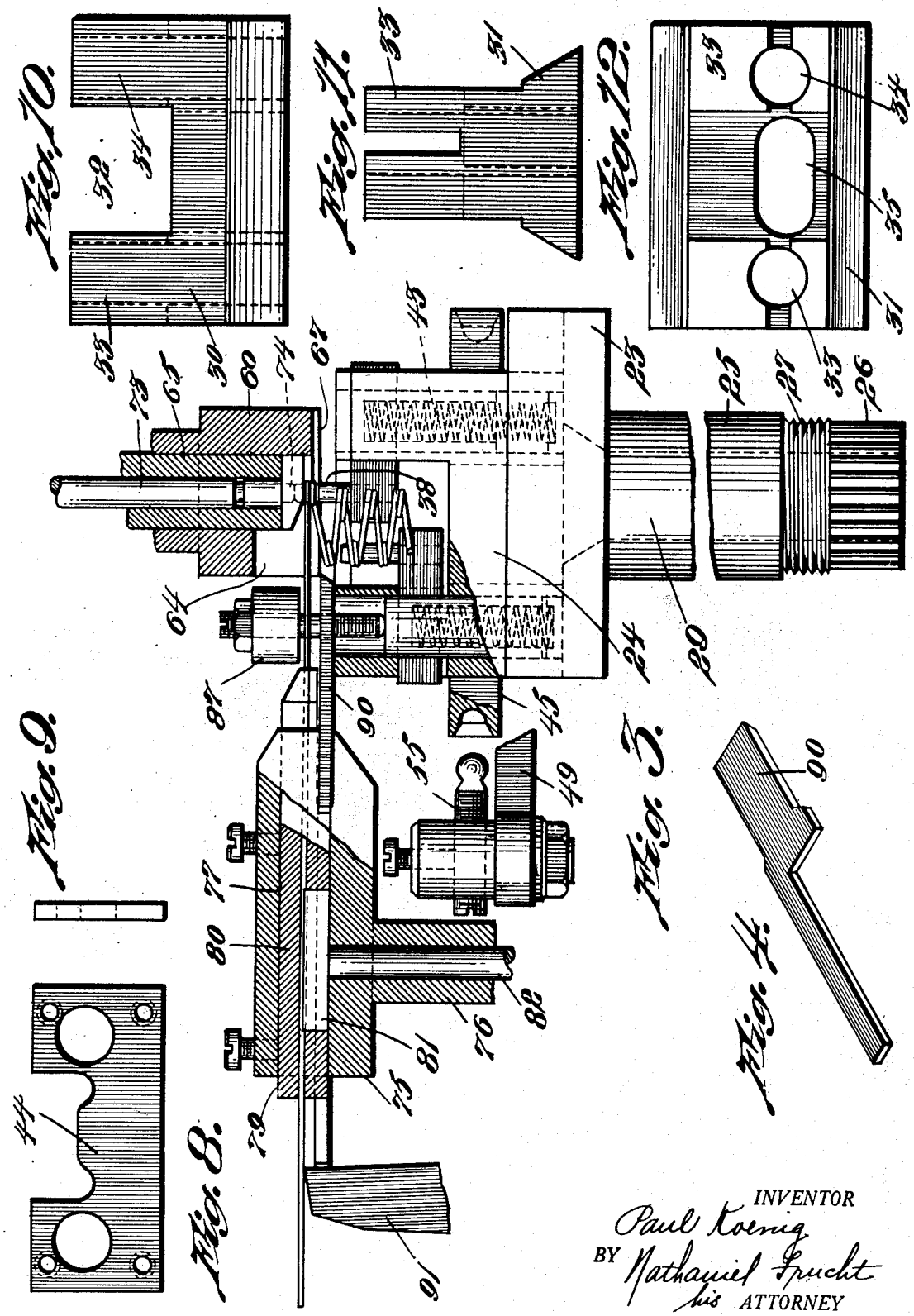
INVENTOR
Paul Koenig
BY Nathaniel Frucht
his ATTORNEY

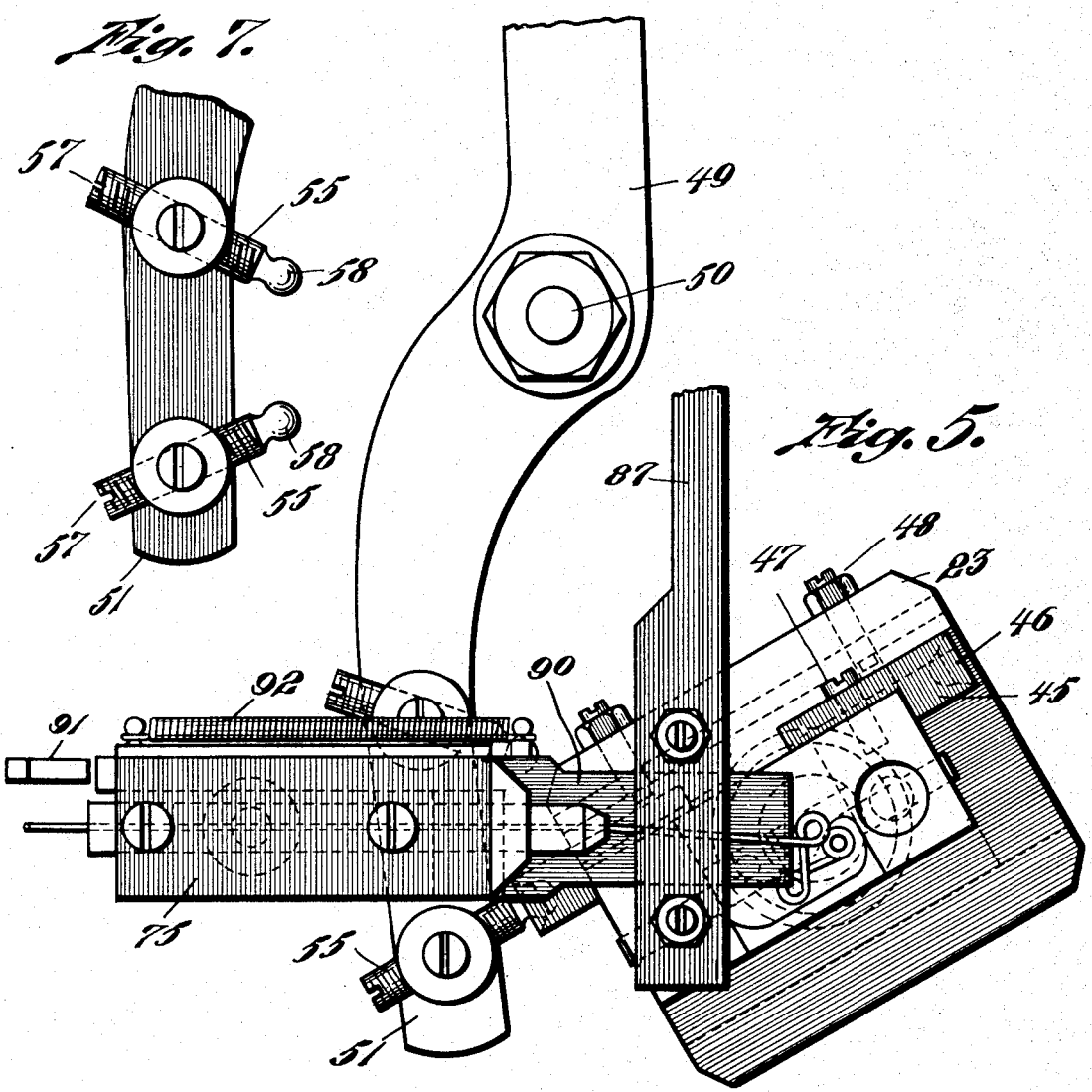
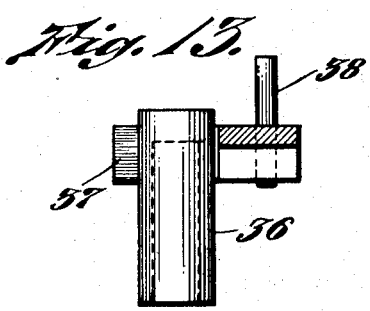
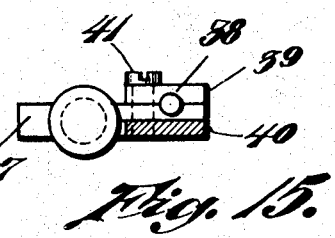

May 9, 1933. P. KOENIG 1,908,261
METHOD AND APPARATUS FOR MANUFACTURE OF SPRING COILS
Filed July 22, 1931  5 Sheets-Sheet 5
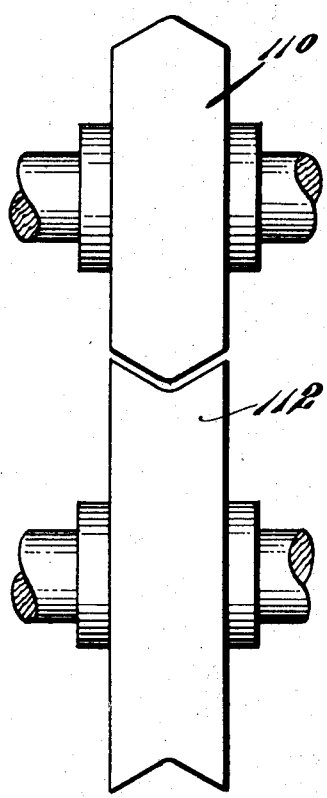
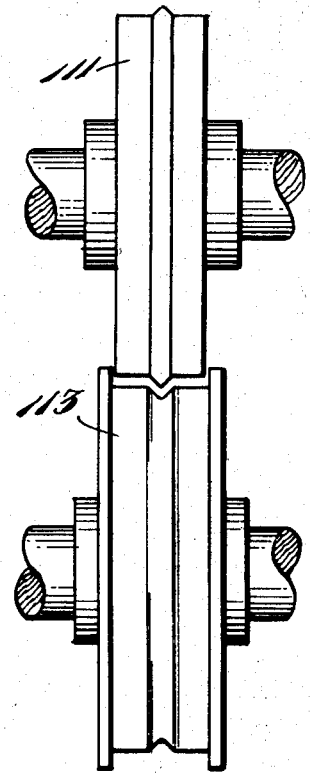
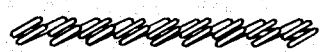
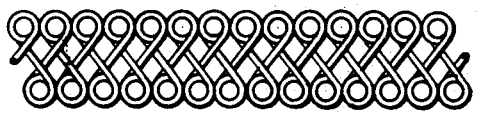
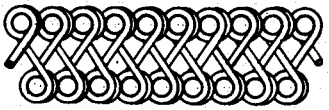
INVENTOR
Paul Koenig
BY Nathaniel Frucht
his ATTORNEY Patented May 9, 1933

1,908,261

UNITED STATES PATENT OFFICE

PAUL KOENIG, OF IRVINGTON, NEW JERSEY, ASSIGNOR TO FORSTNER CHAIN CORPORATION, A CORPORATION OF NEW JERSEY

METHOD AND APPARATUS FOR MANUFACTURE OF SPRING COILS

Application filed July 22, 1931. Serial No. 552,389.

My present invention relates to the manufacture of spring coils, and has particular reference to spring coils of generally flat strip form with the coils in substantially the same plane, such as shown in U. S. Patent No. 906,557.

It has heretofore been difficult to produce these spring coils inexpensively, as the spring coil includes an upper and a lower line of coils, the coils in these lines being reversely wound. The principal object of my invention is therefore to simplify the method of forming these coils, and thus permit automatic manufacture thereof.

In following out the novel method, it has been found that standard spring coil machines cannot be adapted or changed to produce the desired article, and it is therefore a further object of my invention to provide a new arrangement of machine elements that will function to produce the desired type of spring coil.

With these and other objects and advantageous features in view, the invention consists of a novel method of operation and a novel arrangement of machine elements, more fully disclosed in the detailed description following, in conjunction with the accompanying drawings, and more specifically defined in the claims appended thereto.

In the drawings:

Fig. 2 is a side elevation thereof, partly broken away;

Fig. 3 is a side elevation, partly in section, showing the machine elements in one operating position;

Fig. 4 is a perspective view of the slide plate;

Fig. 5 is a plan view, partly broken away, of the machine elements shown in Fig. 3, at a later operating position;

Figs. 6 and 7 are details of construction of two of the operating elements;

Figs. 8 to 15 are views illustrating the detailed construction of the parts making up the winding member;

Figs. 16 and 17 are views of circular formers and their associated rotors for flattening the formed spring coils;

Figs. 18, 19 and 20 are plan, end, and side views of the spring coils as formed in the novel machine;

Figs. 21 and 22 are side and plan views of the partly flattened spring coil; and Figs. 23, 24 are plan and side views of the completed spring coils.

Figure 1:
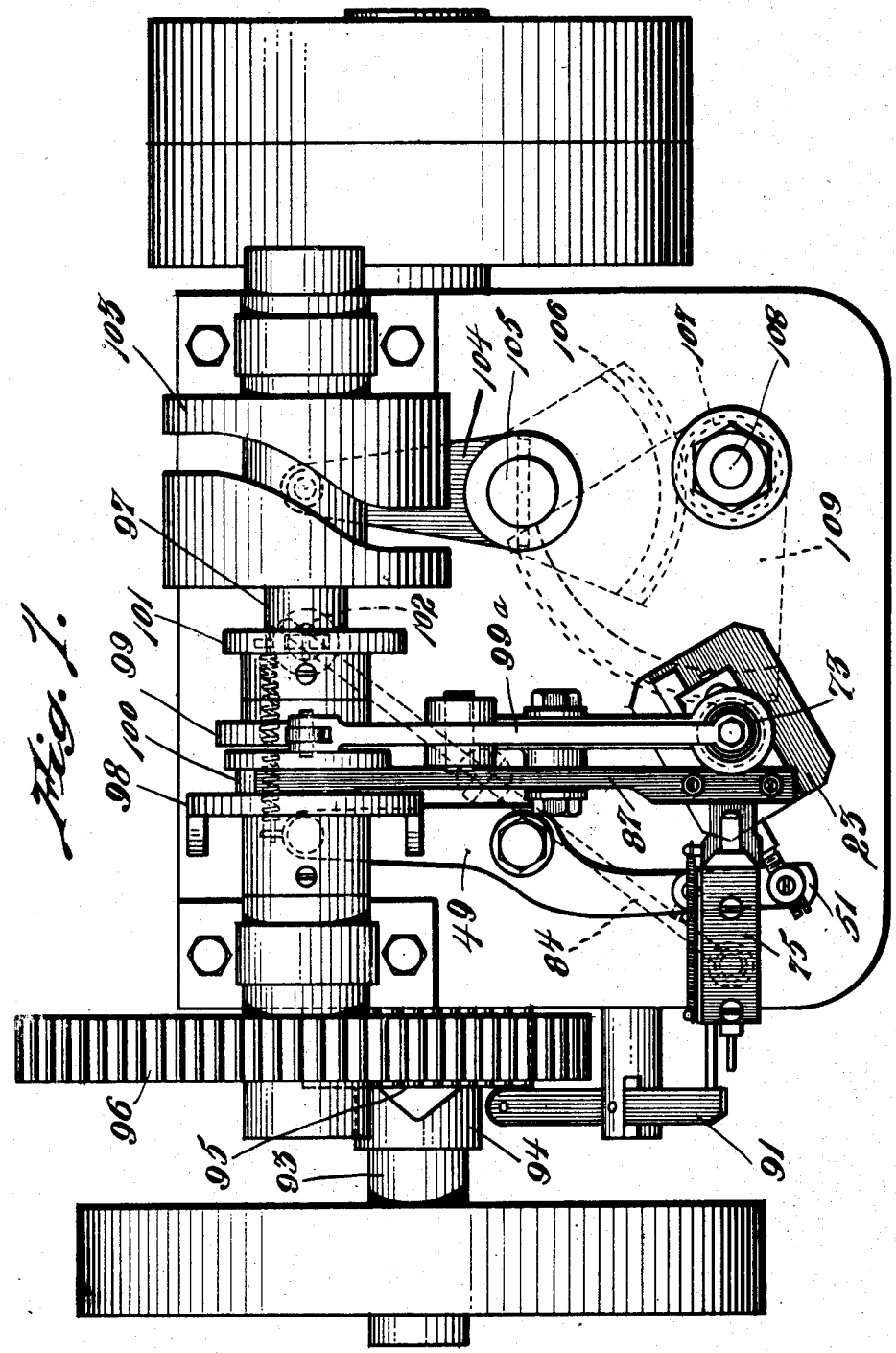
Fig. 1 is a top plan view of the novel machine.

It has been found practical to wind a spring of the desired type by using a rotatable winding block having spaced winding pins, the winding block being intermittently rotated in opposite directions with each pin alternately positioned in the axis of rotation. Each pin therefore acts to wind a coil of the spring material, which is preferably wire, around the other pin, the successive coils being oppositely directed. Suitable mechanism is provided for automatically displacing each formed coil from its winding pin, for shifting the displaced coils out of the paths of the winding pins, for sliding the winding pins so as to position each pin alternately in the axis of rotation, for centering each pin, for rotating the winding block to wind the coils, and for braking the wire as it is fed forwardly, in the proper timed relation.

*The winding mechanism*

Referring now to Figs. 1 and 2, the machine includes a table 20, which as shown is generally rectangular in form, and on which the operating mechanism is mounted. The table is preferably provided with support legs (not shown) at each corner.

A support cylinder 21 is positioned in a suitable bore in the table, adjacent one corner thereof, and has a flange 22 on which the winding block 23 seats, this block having a rectangular top grooved to form a slideway for a winding pin carrier 24, see Fig. 3, and a depending central tubular portion 25 seated in the support cylinder 21 and formed at its end as a gear 26, the part immediately above the gear 26 being threaded, as at 27, to receive a lock washer 28 for locking the winding block to the support cylinder. The central bore 29 of the winding block is enlarged at the upper end thereof, to better receive the formed spring, as hereinafter described.

Referring now to Figs. 8 to 15, the winding pin carrier has a body part 30 with the lower portion 31 bevelled outwardly to slide in the similarly bevelled grooves in the winding block; the upper portion of the carrier has a central opening or space 32 to permit lateral displacement of the formed coils, as hereinafter described, also two spaced slotted housings 33, 34 which receive the winding pin holders, and a central elliptical bore 35 through which the formed coils descend into the central bore of the winding block.

The winding pin holders are shown in Figs. 13 to 15 and include cylinders 36 which are closed at their upper ends and cross bars 37 which are secured to or formed integral with the upper ends and are vertically grooved to receive the winding pins 38; the winding pins are locked to the pin holders by means of lock plates 39, 40 secured to the cross bars by lock screws 41 which pass through suitable openings in the cross bars, the cross bars being recessed to receive the lock plates 40 and the lock plates 39 having vertical grooves which cooperate with the cross bar grooves to firmly grip the winding pins. The winding holder assembly includes a recessed lower foot member 42 and a coil spring 43 which is mounted between the cylinder 36 and the foot member 42, and the two assemblies are slidably mounted into the bores 33, 34 and are locked in place by means of a top plate 44 shown in Figs. 8 and 9, this top plate being removably secured to the winding pin carrier by any suitable means, as by small dowel pins or the like.

To facilitate the reciprocating shift of the winding pin carrier, two rectangular shift bars 45 are mounted on the side of the carrier, and are each provided with suitable rounded recesses 46 at each end thereof to receive the shifting mechanism as hereinafter described, the shift bars being secured to the winding pin carrier by screws 47 or the like. A shim plate of usual type is secured in one bevelled groove of the winding block by screws 48, to facilitate assembly and fitting of the parts.

*The winding pin carrier shifting mechanism*

The mechanism for shifting the winding pin carrier is illustrated in Figs. 5 to 7, and includes a cam actuated bent lever 49 pivotally mounted on the table intermediate its ends, as at 50, the operating end 51 of the lever being bored to receive the depending stems 52 of two vertical cylindrical housings 53 which are locked in place by means of lock nuts 54 threaded on their depending ends. Each housing has a cylindrical transverse bore in which a shift pin 55 is adjustably secured, as by a vertical lock screw 56, one end 57 of the shift pin being slotted to facilitate adjustment, and the other end 58 being rounded to seat in the shift recesses 46 of the shift bar 45.

As clearly shown in Figs. 5 and 7, it is necessary to adjust the shift pins to compensate for the radial difference in the distances of the recesses from the pivot center 50, and the shift pins are angularly mounted so as to be substantially in the direction of shifting movement of the winding pin carrier.

*The winding pin centering mechanism*

The sliding movement of the winding pin carrier changes the relative position and relation of the winding pins, and mechanism is therefore provided to center and to support the axially positioned pin, and to release this pin from its support preparatory to movement of the winding pin carrier.

This mechanism is shown in Fig. 2, and is slidably mounted in a cylindrical bearing sleeve 59 which is secured to the machine table in any desired manner; the mechanism includes a body part 60 which has an upper tubular housing 61 and a lower winding chamber 62. The chamber 62 has a central opening 63 and a side opening 64 through which the wire is fed; a plunger 65 is mounted in the tubular housing and extends into the central opening 63, and has a central bore 66 at its lower end to receive the winding pin as hereinafter described, the end of the plunger being cut away adjacent the side opening 64 to facilitate feed of the wire. An end plate 67 is mounted on the base of the winding chamber, and has a central opening through which the plunger, the winding pin, and the formed coil may pass.

The plunger 65 slidingly fits within the housing 61, and has an upper enlarged head 68 which slides in an upper bore 69 in the housing, this upper bore being larger than the central bore to provide a spring seating shoulder 70; a compression coil spring 71 is secured between the head 66 and the shoulder 70 to normally force the plunger upwardly. The plunger 65 also has a central bore 72 of greater width than the pin receiving bore 66, and is provided with a cam actuated rod 73 which seats in the bore 72 and has a reduced end 74 movable into the bore 66.

*The wire feeding mechanism*

The mechanism for feeding the wire is designed to permit pull of the wire through the side opening 64 of the centering mechanism and above the end plate 67 into the central opening 63. This feeding mechanism is shown in Figs. 4, 5 and 2, and includes a support 75 of generally T shape having a tubular vertical support 76 and a horizontal rectangular bore 77 in the head portion 78. Within this bore is a wire feed block 79 having a wire way therethrough, and a recessed section 80 is provided in the lower portion which exposes the wire to the action of a brake block 81, loosely fitted in the recessed section. This brake block is periodically pressed upwardly to bind the exposed wire by a rod 82 which is upwardly movable in the tubular vertical support 76 upon upward movement of the end 83 of a cam actuated lever 84, an adjusting bolt 85 mounted in the end 83 serving to control the height of the upward movement. As shown in Fig. 2, the tubular portion 76 extends through the machine plate 20, and has a section 86 of greater diameter below the plate to provide a seating shoulder for engaging the lower face of the plate, thus facilitating accurate vertical setting.

The coil releasing mechanism

After each coil is formed, it is necessary to release the formed coil from the winding pin preparatory to shifting of the winding block. This release is effected by forcing the winding pin assembly down, thus freeing the formed coil, and then laterally displacing the freed coil; this mechanism being illustrated in Figs. 2, 4, 5 and 6.

Referring to Figs. 1 and 6, a lever 87 is pivotally mounted intermediate its ends on the machine plate, and has two spaced pressure pins 88, 89 at the operating end adapted to periodically and alternately engage the winding pin assemblies. The two pins are spaced apart to compensate for the different positions of the winding block at coil releasing time, one of these positions being shown in Fig. 5, the other position being oppositely inclined to the line of the wire but at the same angle thereto.

Referring now to Fig. 3, the downward pressure of the pressure pins forces the pin assemblies down against the tension of the springs 43, thus withdrawing the winding pins from the formed coils. The formed coils, however, are still positioned above the pins, and must be displaced to permit removal of the pressure pins and upward movement of the winding pins preparatory to shifting of the block.

This displacement is obtained by means of a slide plate 90, which is slidably mounted in a horizontal groove in the head 78 of the wire feed support 75, and is actuated towards the formed coil by a cam operated lever 91 pivoted to the side of the machine, the slide plate being returned to inoperative position by a tension spring 92 secured at its ends to suitable pins or the like in the head 78 and the slide plate 90. As clearly seen in Fig. 2, the coil engaging edge of the slide plate is bevelled downwardly, to also slightly displace the formed coil, see Fig. 5, downwardly as well as laterally. The formed spring is thus displaced into the opening 35 and the interior of the winding head support 25, the weight of the spring also assisting in pulling the formed coils downwardly.

The power mechanism

The power mechanism is illustrated in Fig. 1, and comprises a main power shaft 93, having the usual fixed and loose pulleys, and fly wheel, thereon. This main shaft, as shown in Fig. 3, has a cam 94 at one end which operates the slide plate operating rod 91, this cam having one operating element or projection, and has a gear 95 which meshes with the gear 96 of the main cam shaft 97, best shown in Fig. 1, the gear 96 rotating at half the speed of the gear 95.

Referring now to Fig. 1, the cam shaft 97 has five cams mounted thereon, the cam 98 having two cam elements spaced 180 degrees apart for periodically engaging the end of the winding block shift lever 49, the cam 99 similarly periodically engaging the end of a lever 99a, pivotally mounted intermediate its ends on the machine table, which adjustably engages the head of the winding pin centering rod 73, the cam 100 which periodically actuates the lever 87 to depress the winding pins, the cam 101 which periodically presses on a spring pressed rod 102 and thus moves the pivoted lever 84, see Fig. 2, to apply the wire brake, and the cam 103, which transmits power to the winding block rotating gearing.

The cam 103 is preferably of the slot type, and oscillates a lever 104 which in turn oscillates a shaft 105 mounted in and extending through the table, this shaft having a segmental gear 106 keyed thereon which meshes with a circular gear 107 keyed to a stub shaft 108 mounted in the table; a segmental gear 109 is keyed on this stub shaft, and meshes with the gear 26 formed on the end of the bearing block support.

The coil flattening mechanism

As the spring coil leaves the forming machine, it has the appearance shown in Fig. 18; it is first passed through an acute angled former of the type shown in Figure 16, whereupon it is bent to the shape shown in Figures 19 and 20. Passing it once more through the same former, Figure 16, will bend it to the shape as shown in Figures 20 and 21. It is then flattened in the former shown in Figure 17, whereupon it becomes shaped as shown in Figures 23 and 24.

These formers are of the rotating type, and include circular rotating upper rolls 110, 111, respectively of the contour shown, and similar rotating lower rolls 112, 113, shaped to correspond, the spring coils being gripped between the upper and lower rolls and fed forwardly by the pull of the formers.

The operation of the machine

The complete automatic formation of the coil spring may now be explained:

Referring to Fig. 2, the spring wire has been drawn through the wire feed mechanism, and has been wound around the winding pin which is in the up position, and is supported in the bore 66 of the centering mechanism; this winding was due to rotation of the winding block, the right hand winding pin which has a coil thereon revolving around the other winding pin due to the right hand position of the winding block.

Now let us assume that the winding block has rotated to the position shown in Fig. 5; at this time, the pressure pin lever 87 moves to force the left hand winding pin holder down thus releasing the coil thereon and the slide plate is moved laterally to displace this released coil; the slide plate and the pressure pin lever are now moved back, as the released coil is free from the left-hand winding pin.

The lever 100 then presses down, moving rod 73 first, and then plunger 65, thus forcing the winding pin and the formed coil down through and below the center opening of the end plate 67. The shift lever 49 now operates to shift the winding pin carrier to the right, thus bringing the released winding pin beneath the centering mechanism and moving the winding pin with the formed coil along the lower face of the end plate to the right. The lever 100 is now moved back, and the released winding pin moves up, due to the pressure of spring 43, to force the end of centering rod 73 up, the plunger moving upwards independently under the influence of the spring 71 for a shorter distance to permit the winding pin to seat in the bore 66.

The winding block is now rotated 600 degrees in the opposite direction, thus winding the wire on the axially positioned winding pin by rotation of the coil carrying winding pin around it. Just before the winding is completed and the winding block stops in the position complementary to that shown in Fig. 5, the brake is applied to the wire by movement of lever 84 to grip the wire and hold it firmly until the coil is completed; the sequence is then repeated.

It is therefore clear that the forming machine first winds one coil on one pin, by movement of the second pin around it, then removes the coil from the second pin, shifts the pins, and winds a further coil, in the opposite direction, by rotating the first pin around the second pin.

The formed coil spring is then flattened in the formers to obtain the desired flat shape.

While I have described specific constructions of a forming machine and forming dies, it is obvious that desired changes in the construction and arrangement of the machine elements, and in the procedure followed, may be made without departing from the spirit and the scope of the invention as defined in the appended claims.

I claim:

1. In an apparatus of the type described, a winding device having spaced winding elements, means for feeding spring material thereto, and means for successively and intermittently rotating each of said winding elements about the other to form spaced spring coils.

2. In an apparatus of the type described, a winding device having spaced winding elements, means for feeding spring material thereto, means for successively and intermittently rotating each of said winding elements about the other to form spaced spring coils, and means for displacing said spring coils from the winding elements after such rotation.

3. In an apparatus of the type described, a rotatable winding device having spaced winding elements, means for feeding spring material thereto, means for alternately positioning each winding element at the axis of rotation, and means for rotating the other winding element about the winding element at the axis of rotation.

4. In an apparatus of the type described, a rotatable winding device having spaced winding elements, means for feeding spring material thereto, means for alternately positioning each winding element at the axis of rotation, and means for rotating the other winding element about the winding element at the axis of rotation, the successive rotations being in opposite directions.

5. In an apparatus of the type described, a rotatable winding device having spaced winding elements, means for feeding spring material thereto, means for alternately positioning each winding element at the axis of rotation, and means for rotating the other winding element about the winding element at the axis of rotation, the successive rotations being in opposite directions and comprising more than one complete revolution.

6. In an apparatus of the type described, a rotatable winding mechanism having spaced winding pins thereon, means for feeding wire to said winding pins, means for intermittently shifting said winding pins to alternately position each pin at the axis of rotation of said winding mechanism, and means for intermittently rotating said winding mechanism.

7. In an apparatus of the type described, a rotatable winding mechanism having spaced winding pins thereon, means for feeding wire to said winding pins, means for intermittently shifting said winding pins to alternately position each pin at the axis of rotation of said winding mechanism, and means for intermittently rotating said winding mechanism with successive rotations in opposite directions.

8. In an apparatus of the type described, a rotatable winding mechanism having spaced winding pins thereon, means for feeding wire to said winding pins, means for intermittently shifting said winding pins to alternately position each pin at the axis of rotation of said winding mechanism, and means for intermittently rotating said winding mechanism with successive rotations in opposite directions, each rotation comprising more than one complete revolution.

9. In an apparatus of the type described, a rotatable winding block having a winding pin carrier thereon, means for intermittently rotating said block and means for intermittently reciprocating said carrier between said rotation periods.

10. In an apparatus of the type described, a rotatable winding block having a winding pin carrier thereon, means for intermittently rotating said block in opposite directions, and means for intermittently moving said carrier in opposite directions between said rotation periods.

11. In an apparatus of the type described, a rotatable winding block, a reciprocatable carrier on said block, spaced winding pins on said carrier, means for feeding wire to said pins, means for alternately positioning each pin in the axis of rotation of said block, means for intermittently rotating said block successively in opposite directions to coil wire around the axially positioned pin and means for releasing the coiled wire from the other pin subsequent to said rotation and prior to positioning of the other pin in said axial position.

12. In an apparatus of the type described, a rotatable winding block, a reciprocatable carrier on said block, spaced winding pins on said carrier, means for feeding wire to said pins, means for alternately positioning each pin in the axis of rotation of said block, means for securing the axially positioned pin, means for intermittently rotating said block successively in opposite directions to coil wire around the axially positioned pin and means for releasing the coiled wire from the other pin and for releasing the axially positioned pin subsequent to said rotation and prior to positioning of the other pin in said axial position.

13. In an apparatus of the type described, a rotatable winding block, a reciprocatable carrier on said block, spaced winding pins on said carrier, means for feeding wire to said pins, means for alternately positioning each pin in the axis of rotation of said block, means for intermittently rotating said block successively in opposite directions to coil wire around the axially positioned pin, and means for releasing the coiled wire from the other pin and for displacing it laterally subsequent to said rotation and prior to positioning of the other pin in said axial position.

14. In an apparatus of the type described, a rotatable winding block, a reciprocatable carrier on said block, spaced winding pins on said carrier, means for feeding wire to said pins, means for alternately positioning each pin in the axis of rotation of said block, means for securing the axially positioned pin, means for intermittently rotating said block successively in opposite directions to coil wire around the axially positioned pin and means for releasing the coiled wire from the other pin and for displacing it laterally and for releasing the axially positioned pin subsequent to said rotation and prior to positioning of the other pin in said axial position.

15. In the manufacture of coil springs, the method comprising the step of forming spaced coils in spring material by winding each formed coil about a center of rotation laterally displaced from its own center to form the next coil.

16. In the manufacture of coil springs, the steps of forming spaced coils in spring material by winding a coil about a center of rotation, displacing said wound coil laterally from said center of rotation, and winding the displaced wound coil about said center of rotation to form the next coil.

17. In the manufacture of coil springs, the steps of forming spaced coils in spring material by winding a coil in one direction about a center of rotation, displacing said wound coil laterally from said center of rotation, and winding the displaced wound coil about said center of rotation in the opposite direction to form the next coil.

18. In a coil winding machine, means for winding spring material about a center of rotation to form a coil, and means for winding the said coil about a center of rotation laterally displaced from its own center to form the next coil.

19. In a coil winding machine, means for winding spring material about a center of rotation to form a coil, means for displacing said coil laterally from said center of rotation, and means for winding the displaced coil about said center of rotation to form the next coil.

20. In a coil winding machine, means for winding spring material in one direction about a center of rotation to form a coil, means for displacing said coil laterally from said center of rotation, and means for winding the displaced coil about said center of rotation in the opposite direction to form the next coil.

In testimony whereof I affix my signature.

PAUL KOENIG.